United States Patent [19]
Shonerd et al.

[11] 3,760,834
[45] Sept. 25, 1973

[54] RESERVOIR FOR PRESSURIZED FLUIDS

[76] Inventors: David Edwin Shonerd, 1025 Winther Way, Santa Barbara, Calif.; Alvin Singer, 1125 Hohlfelder Rd., Glencoe, Ill.; Charles L. Vaughan, 95 Monarch Bay, South Laguna, Calif.

[22] Filed: June 27, 1972

[21] Appl. No.: 266,653

[52] U.S. Cl. .............................................. 137/255
[51] Int. Cl. .......................................... F16k 51/00
[58] Field of Search ...................... 137/255, 262, 263

[56] References Cited
UNITED STATES PATENTS
| | | | |
|---|---|---|---|
| 460,490 | 9/1891 | Yates et al. | 137/255 |
| 1,215,027 | 2/1917 | James | 137/255 |
| 2,615,615 | 10/1952 | Young | 137/255 X |

*Primary Examiner*—Henry T. Klinksiek
*Assistant Examiner*—Robert J. Miller
*Attorney*—Pastoriza & Kelly

[57] ABSTRACT

A plurality of straight tubes in side by side relationship are surrounded by a single long tube of substantially lesser diameter helically wound about the straight tubes to define a reservoir for pressurized natural gas. The helically wound single long tube serves both as a protective covering and strengthening structure for the straight tubes. The straight tubes and helically wound tube may be interconnected by suitable manifolding and a fill opening provided for storing pressurized fluid. The tubular configuration is that of a fairly flat parallele-piped corresponding in size to a conventional standard automobile gasoline tank and thus well suited to replace the conventional gasoline tank to drive vehicles by natural gas.

15 Claims, 5 Drawing Figures

PATENTED SEP 25 1973　3,760,834

3,760,834

RESERVOIR FOR PRESSURIZED FLUIDS

This invention relates generally to containers and more particularly to a reservoir for high pressure fluids preferably for use in storing natural gas or equivalent fuel for driving motor vehicles.

BACKGROUND OF THE INVENTION

It is well known that conventional automobiles, buses, and other vehicles can be operated on natural gas rather than conventional gasoline. The use of natural gas not only reduces air pollutants substantially, but costs about half as much as gasoline.

The only real drawback to the use of natural gas in all vehicles is the fact that the gas must be under pressure in order that a sufficient quantity of gas is available to drive the vehicle an appreciable distance. While many tanks or storage reservoirs for natural gas are known in the art, most take the form of a large sphere or cylinder. Such structures are not only awkward to fit in a vehicle, particularly a standard American type automobile, but are also subject to fragmentation upon explosion which can cause substantial damage if not loss of life.

BRIEF DESCRIPTION OF THE PRESENT INVENTION

With the foregoing in mind, the present invention contemplates a novel tank construction serving as a reservoir for pressurized fluids such as natural gas. The invention is primarily characterized in that the reservoir can be constructed in a variety of different shapes so that it can easily be accommodated in the various vehicles presently powered by conventional gasoline or diesel engines. Further, the construction is such that the risk of explosion is minimal and in the unlikely event that such an explosion did occur, the risk of damage or injury is substantially nil.

While the preferred application for the reservoir for pressurized fluids is as a substitute fuel tank in automobiles, it should be understood that the construction and the various advantages of the reservoir make it useful for many other applications.

Briefly, the reservoir itself comprises at least two and preferably a plurality of straight tubes each of an outside dimension D in side by side relationship with their axes preferably in a flat plane although this plane could be slightly arcuate. A single long tube of outside diameter $d$ substantially less than the diameter of the straight tubes is wound around the straight tubes transverse to the axes thereof in a helical manner to cover substantially the entire length of the straight tubes. Means for providing communication between the interiors of the straight tubes and the single long tube, with the exterior so that pressurized fluid may be passed into and removed from the tubes may take the form of suitable header piping or manifolds.

By using five straight tubes wound with a single long tube wherein the diameter of the straight tubes is about six times the diameter of the small tubes and wherein the length of the straight tubes is about ten times the diameter of the straight tubes, there results a tubular configuration in the form of a parallelepiped of length, height, and width dimensions corresponding substantially to that of the standard American automobile gas tank. Thus the pressurized reservoir of the present invention may readily be substituted for the conventional gas tank. Moreover, the single long tube serves both as a protective covering and a strengthening means for the straight tubes. In otherwords, any damage from any type of explosion of the straight tubes is inhibited by the single long tube helically wound about the straight tubes.

BRIEF DESCRIPTION OF THE DRAWINGS

A better understanding of the invention will be had by now referring to the accompanying drawings in which.

DETAILED DESCRIPTION OF THE INVENTION

Figure 1:
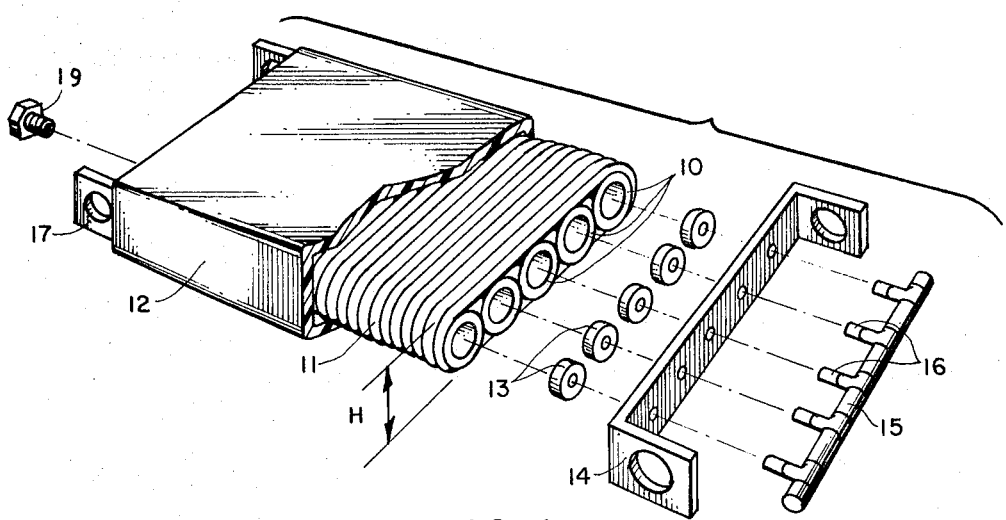
FIG. 1 is a fragmentary perspective view partly in exploded form of the basic components making up the preferred embodiment of the present invention.

Referring first of FIG. 1, the reservoir for pressurized fluids includes a plurality of identical elongated straight tubes 10 of given length and outside diameter arranged in side by side parallel relationship, preferably with their axes lying in a single flat plane. A single long tube 11 having an outside diameter substantially less than the outside diameter of the straight tubes is wound around the tubes transverse to the tube axis in a helical manner to cover the entire length of the straight tubes.

The resulting tubular configuration has an overall shape corresponding generally to that of a parallelepiped. This tubular configuration, if desired, may be encased in a plastic housing 12 as illustrated.

Means for providing communication between the interiors of the straight tubes and the single long tube, with the exterior so that a fluid under pressure may be passed into the tubes for storage and taken from the tubes for use include various end plates 13 cooperating with a supporting bracket 14 for a header pipe 15. The header pipe may include suitable T type connectors 16 so that when the described elements are assembled, the ends of the straight tubes 10 will all be in communication with each other.

A symmetrical bracket 17 may be provided at the opposite ends of the straight tubes 10.

Figure 2:
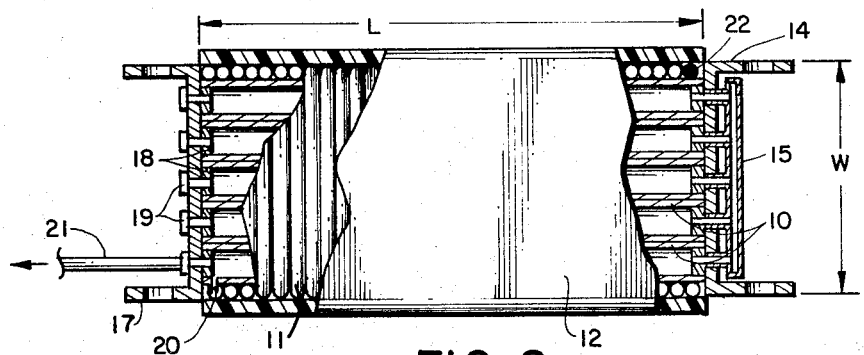
FIG. 2 is a top plan view with portions partly broken away of the structure of FIG. 1 in assembled relationship.

With particular reference now to FIG. 2, it will be noted that the referred to opposite ends of the straight tubes include end plates 18 closing the ends of the tubes 10 which plates cooperate with the bracket 17 and suitable safety valve means in the form of plugs 19. It should be noted that the end plates 13 and 18 for the tubes 10 are all identical in construction and that the brackets 14 and 17 are also of identical construction as described. The only difference in the ends is that one includes the header pipe 15 while the other includes the end plugs.

The foregoing construction is important in that it simplifies assembly line type manufacture of the tanks. While the details of the connection of the plugs and the header pipe to the end plates of the straight tubes is not illustrated in FIG. 2, it will, of course, be understood that suitable threaded couplings would be provided to effect the necessary connections after the brackets have been properly positioned. Further, it should be noted that the brackets 14 and 17 not only serve as a mounting means for the tubular configuration but also will serve to hold the straight tubes in their side by side relationship, the small openings in each of the brackets receiving the T connections of the header pipe and the safety plugs 19 respectively.

Referring to both FIGS. 1 and 2, the resulting parallelepiped configuration of the straight tubes 10 and single long tube 11 without considering the casing or end brackets has length, height, and width dimensions indicated by the letters L, H, and W.

Figure 3:
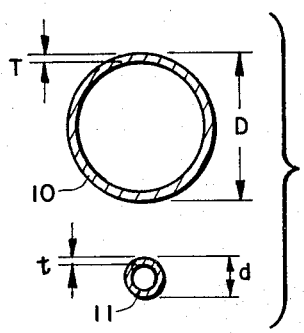
FIG. 3 shows cross-sections of tubes utilized in making up the reservoir of FIGS. 1 and 2.

Referring also to FIG. 3, the outside diameter of each of the straight tubes 10 is shown at $D$ with a wall thickness of $T$ and the outside diameter of the single long tube 11 is shown at $d$ with a wall thickness $t$.

The relationship of the foregoing dimensions with those of the overall parallelepiped pipe configuration is as follows:

The length dimension L corresponds substantially to the length of each of the straight tubes. The height dimension H corresponds to the sum of the diameter $D$ of the straight tube and twice the diameter $d$ of the single long tube. Finally, the width dimension $W$ corresponds to the outside diameter $D$ of the straight tube times the number of straight tubes plus twice the outside diameter $d$ of the single long tube.

For the preferred embodiment shown, the above relationships may be expressed as follows:

$$H = D + 2d$$
$$W = 5D + 2d$$

Further, in the preferred embodiment, L is made equal to $10D$ and $D$ equals $6d$.

By making $D$ equal to 6 inches and $d$ equal to 1 inch, the overall dimensions would be 60 inches × 8 inches × 32 inches, which dimensions correspond substantially to that of a gasoline tank in a standard American automobile.

From the description thus far, it will become immediately evident how easy it is to change the overall tubular configuration to fit other conditions than that of a standard American automobile. For example, by diminishing the number of straight tubes, the width $W$ may be decreased. On the other hand, by increasing the number of straight tubes, the width $W$ may be greatly increased. Similarly, the length dimension $L$ of the straight tubes may be varied. The height dimension $H$ is more or less fixed by the selected diameters of the tubes but by varying these parameters, a desired height $H$ can be provided.

Following are the relative relationships between the length $L$, height $H$, and width $W$ dimensions that can be tolerated within the scope of the present invention:

$$20H > L > 3H$$
$$20H > W > 2H$$
$$10d > D > 3d$$

In the particular embodiment shown in FIG. 2, it will be noted that the lower left end of the single long tube 11 communicates through a small passage 20 with one of the straight tubes 10. An inlet-outlet fill pipe 21 may be connected to this particular straight tube 10 in place of the safety plug 19 as illustrated in FIG. 2. The other end of the single long tube 11 helically wound about the straight tubes terminates in a closed end as indicated at 22 in the upper right hand portion of FIG. 2.

With the foregoing arrangement, it will be clear that all of the straight tube interiors are in communication with each other through the header pipe 15 and with the inlet-outlet tube 21. Further, because of the passage 20 the interior of the single long tube 11 also communicates with the interior of the straight tubes.

Figure 4:
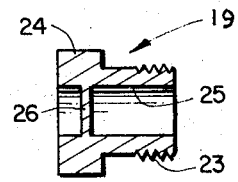
FIG. 4 is a cross-section of a safety valve means for the reservoir.

FIG. 4 illustrates one of the safety valves 19 which, in the particular embodiment shown, may include external threads 23 for reception in the end plates 18 in the straight tubes of FIG. 2. The other end of the body 19 would include wrench flats 24 and the body itself has a hollow interior 25 closed off by a thin diaphragm portion 26. The diaphragm 26 is designed to fragment when the pressurized fluid within the straight tubes exceeds a given pressure. Thus, in the unlikely event that an extraordinarily high pressure should build up, the diaphragm 26 will fragment before rupture of any of the tubes. It should be understood that other types of safety valves which will open in response to the internal pressure exceeding a given value could be utilized.

Figure 5:
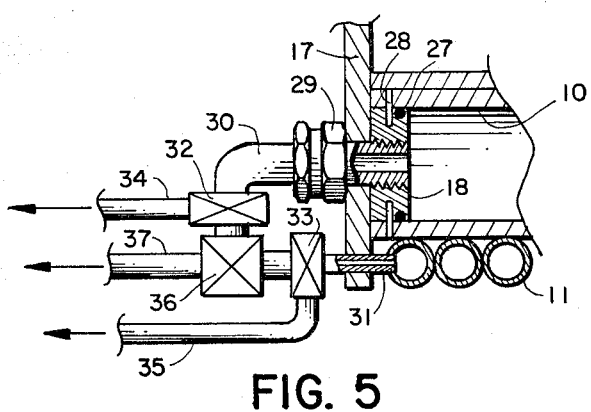
FIG. 5 is an enlarged fragmentary view partly in cross-section illustrating one type of valving means that may be utilized for filling and withdrawing pressurized fluid from the reservoir.

FIG. 5 shows in greater detail the end plate construction for the ends of the straight tubes 10 and in addition shows a modified valving arrangement for placing the interior of the straight tubes and the interior of the single long tube in communication with the exterior or in communication with each other.

More particularly, it will be noted that the typical end plate 18 is provided with an O-ring seal 27 and lateral pin 28 to lock the plate into the end of the tube 10. Rather than the inlet-outlet tube 21 as illustrated in FIG. 2, a coupling 29 and cooperating pipe 30 connects to the end plate 18. Also, rather than a communicating passage such as 20 between the single long tube 11 and the interior of the straight tube 10, there is provided an outlet pipe 31. The pipes 30 and 31 connect respectively to first and second valve means 32 and 33. First outlets for these valves are shown at 34 and 35 and the arrangement is such that operation of the valve 32 will place only the pressurized fluid within the straight tubes 10 in communication with the exterior while operation of the valve 33 will place only the pressurized fluid in the single long tube 11 in communication with the exterior.

In addition to the above-noted valves, there is also provided a third valve means 36 connected between the valves 32 and 33 with a common outlet 37 to the exterior. By proper operation of the valve, both interiors of the straight tubes and the single long tube may be placed simultaneously into communication with the exterior through the valve 32, 33 and 36. A selectivity is thus provided any user of the reservoir.

With the foregoing arrangement, it will be evident that different types of pressurized fluids may be stored in the straight tubes and in the single long tube respectively. Alternatively, the same type of pressurized fluid may be stored and the volume within the single long tube used as a back-up storage or safety fuel tank for the pressurized fluid in the main straight tubes.

In the particular preferred embodiment described in FIGS. 1 and 2, the interior of the straight tubes would constitute about 80 percent of the overall volume and the interior of the single long tube about 20 percent. The single long tube itself may be made of different material from the straight tubes to provide greater structural integrity and greater protection. For example, the inner straight tubes could be thin-wall heat treated steel with high yield stress but low percent elongation. The single long tube wrapped about the straight tubes could be tough steel with a high percent elongation to provide protection from impact loads.

The tolerances of the ratio of the outside diameter to the tube wall thicknesses for each of the tubes as shown in FIG. 3 may be as follows:

$$100 > D/T > 20$$

$$50 > d/t > 10$$

In the preferred construction of the tubes themselves, $D/T = 80$ and $d/t = 35$.

OPERATION

In operation, a reservoir for pressurized fluid; for example, natural gas, may readily be fabricated in a desired shape for use in a vehicle or other application wherein there is only a given volume for accomodating the reservoir. As stated, the overall tubular configuration may be shaped with desired length, height, and width dimensions by varying the number of straight tubes utilized in the configuration and by varying the lengths and/or the diameters of the straight tubes. For a given diameter of straight tubing, a large variety of shapes may be provided without having to make any substantial changes in the available tooling. Since the straight tubes are all of identical size once a size has been selected, the proper lengths of the tubing may easily be cut and a proper length of the single long tube to be wrapped about the straight tubes can be cut to result in the desired selected configuration. The cutting and wrapping operations can be preformed by the same machinery regardless of the lengths involved. Moreover, and as mentioned, it is not essential that the axes of the straight tubes all lie in a flat plane but they may lie in a partially curved plane to accomodate the overall configuration to a peculiarly shaped volume.

The means for providing communication between the interiors of the straight tubes and the interior of the single long tube, with the exterior may take various forms as described. Thus, there may be a straight through communication between the single long tube and the interior of the straight tubes as indicated by the passage 20 in the embodiment shown in FIG. 2. A single inlet and outlet fill tube such as 21 shown in FIG. 2 or a simple valve may be provided and the interior of the reservoir completely filled with pressurized fluid. In the particular preferred embodiment described for a fuel tank for vehicles, natural gas under pressure of 2,500 p.s.i. would be a typical pressurized fluid. In this case, the safety plugs or valves 19 would be designed to rupture or open under a pressure exceeding, for example, 5,000 p.s.i.

The particular valving structure as described in FIG. 5 could be readily applied without any major changes in the reservoir structure itself except for the blocking of the passage 20. With the piping and valves shown in FIG. 5 and as already described, a selection of pressurized fluid stored in the straight tubes or in the single long tube can be made. Alternatively, these two volumes may be placed into communication with each other through the third valve means described and pressurized fluid from each simultaneously expelled through a single outlet.

Because of the great flexibility in the overall dimensions of the reservoir for pressurized fluids as described, it can easily be substituted for conventional gas tanks on various makes of cars as well as in buses and other vehicles. The invention thus provides for the first time an economical and practical means for storing natural gas as a fuel for vehicles as well as in other environments. Complete safety is assured by the wrapping around configuration of the single long tube which, as stated, both protects and strengthens the main straight tubes.

Various further applications and uses as well as modifications falling clearly within the scope and spirit of this invention will occur to those skilled in the art. The reservoir for pressurized fluids is therefor not to be thought of as limited to the exact embodiment set forth merely for illustrative purposes.

What is claimed is:

1. A reservoir for pressurized fluids comprising, in combination: at least two straight tubes each of outside diameter D in side by side relationship; a single long tube of outside diameter $d$, less than D, wound around the straight tubes transverse to the axes thereof in a helical manner to cover substantially the entire length of the straight tubes; and means for providing communication between the interiors of the straight tubes and the single long tube, with the exterior so that pressurized fluid may be passed into and removed from the tubes.

2. A reservoir according to claim 1, in which D is substantially $6d$ and the length L of the straight tubes is substantially $10D$.

3. A reservoir according to claim 2, in which there are provided five straight tubes in side by side relationship with their axes lying in a single flat plane.

4. A reservoir for pressurized fluids comprising, in combination:
   a. a plurality of identical elongated straight tubes of given length L and outside diameter D arranged in side by side parallel relationship with their axes lying in a single flat plane;
   b. a single long tube having an outside diameter d substantially less than said given outside diameter D wound around the plurality of straight tubes transverse to the axes of the straight tubes in a helical manner to cover the entire length of the straight tubes and define a tubular configuration having an overall shape corresponding generally to that of a parallelepiped of predetermined length L, height H, and width W dimensions, the length dimension L corresponding substantially to that of the given length L of the straight tubes, the height dimension H corresponding to the sum of the given outside diameter D of a straight tube and twice the outside diameter d of the single long tube, and the width dimension W corresponding to the given outside diameter D of a straight tube times the number of straight tubes plus twice the outside diameter $d$ of the single long tube; and
   c. means for providing communication between the interiors of the straight tubes and the single long tube, with the exterior so that a fluid under pressure may be passed into the tubes for storage and taken from the tubes for use, the single long tube serving as a protective covering and strengthening means for the straight tubes.

5. A reservoir according to claim 4, in which said tubular configuration is surrounded by a plastic casing, the length, height, and width dimensions corresponding substantially to that of a standard automobile gasoline tank.

6. A reservoir according to claim 4, in which said length L, height H, and width W dimensions fall within the following relative relationships:

$$20H > L > 3H$$
$$20H > W > 2H$$

and in which the outside diameter D of a straight tube and the outside diameter d of the single long tube fall within the following relative relationship:

$$10d > D > 3d.$$

7. A reservoir according to claim 4, in which said means for providing communication includes header pipe means interconnecting the straight tubes together, one end of the single long being closed; and means interconnecting its other end for communication with the exterior.

8. A reservoir according to claim 7, in which said means interconnecting the other end of the long tube places it in communication with the straight tubes so that a single type of pressurized fluid may be stored in both the straight tubes and the single long tube.

9. A reservoir according to claim 7, in which said means interconnecting the other end of the long tube places it in direct communication with the exterior to define a separate filling and emptying means for the long tube so that a different type of pressurized fluid may be stored in the single long tube from that stored in the straight tubes.

10. A reservoir according to claim 7, in which said means for providing communication includes a first separate inlet and outlet valve means communicating with said straight tubes and in which said means interconnecting the other end of said single long tube includes a second separate inlet and outlet valve means to the exterior; and a third valve means interconnected with the first and second valve means for placing both the straight tubes and single long tube simultaneously in communication with the exterior whereby a user can elect to withdraw pressurized fluid from the straight tubes only, from the single long tube only, or from both the straight tubes and single long tube simultaneously.

11. A reservoir according to claim 4, including safety valve means opening in reponse to fluid pressure exceeding a given pressure connected to at least one of the straight tubes so that pressure in the straight tubes is relieved if the fluid pressure stored therein exceeds said given pressure.

12. A reservoir according to claim 4, including bracket mounting means connected to the ends of the straight tubes serving to hold the straight tubes in their side by side parallel relationship and also enabling mounting of the tubular configuration in a vehicle.

13. A reservoir according to claim 4, in which said length L, height H, and width W dimensions have the following relationship to the outside dimater D of the straight tubes and the outside diameter d of the single long tube:

$$L = 10D$$
$$H = D + 2d$$
$$W = 5D + 2d$$

and in which $D = 6d$.

14. A reservoir according to claim 4, in which if T is the thickness of the wall of the straight tube and $t$ the thickness of the wall of the single long tube, then $$100 > D/T > 20$$

and $50 > d/t > 10$

15. A reservoir according to claim 11, in which the pressurized fluid is natural gas at a pressure of 2,500 p.s.i., said given pressure being greater than 5,000 p.s.i.

* * * * *